(12) United States Patent
Reynolds, Jr. et al.

(10) Patent No.: US 7,578,039 B2
(45) Date of Patent: Aug. 25, 2009

(54) DOPE RELIEF METHOD FOR WEDGE THREAD CONNECTIONS

(75) Inventors: Harris A. Reynolds, Jr., Houston, TX (US); Robert S. Sivley, IV, Kingwood, TX (US)

(73) Assignee: Hydril LLC, Houston, TX (US)

( * ) Notice: Subject to any disclaimer, the term of this patent is extended or adjusted under 35 U.S.C. 154(b) by 280 days.

(21) Appl. No.: 11/420,441

(22) Filed: May 25, 2006

(65) Prior Publication Data
US 2006/0201669 A1    Sep. 14, 2006

(51) Int. Cl.
*B23P 11/02* (2006.01)
*E21B 19/18* (2006.01)

(52) U.S. Cl. ...................................... 29/447; 166/77.51
(58) Field of Classification Search ................... 29/460, 29/447, 428; 166/77.51; 173/213; 81/176.1
See application file for complete search history.

(56) References Cited

U.S. PATENT DOCUMENTS

| | | | |
|---|---|---|---|
| 3,822,902 A | 7/1974 | Maurer et al. | |
| 4,133,095 A | 1/1979 | Lewis et al. | |
| RE30,647 E | 6/1981 | Blose | |
| 4,364,587 A | 12/1982 | Samford | |
| 4,419,912 A | 12/1983 | Sotome et al. | |
| 4,703,954 A | 11/1987 | Ortloff | |
| 4,751,916 A | 6/1988 | Bory et al. | |
| 5,255,559 A | 10/1993 | Jansch et al. | |
| RE34,467 E | 12/1993 | Reeves | |
| 5,360,239 A | 11/1994 | Klementich | |
| RE34,928 E | 5/1995 | Highfield et al. | |
| 5,454,605 A | 10/1995 | Mott | |
| 6,026,675 A * | 2/2000 | Jansch .......................... | 73/49.5 |
| 6,050,610 A | 4/2000 | Enderle | |
| 6,206,436 B1 | 3/2001 | Mallis | |
| 6,218,768 B1 | 4/2001 | Lee et al. | |
| 6,314,817 B1 | 11/2001 | Lindback et al. | |
| 6,550,821 B2 | 4/2003 | DeLange et al. | |
| 6,578,880 B2 | 6/2003 | Watts | |
| 6,682,101 B2 | 1/2004 | Watts | |
| 6,722,706 B2 | 4/2004 | Church | |
| 6,905,149 B2 | 6/2005 | DeLange et al. | |
| 6,940,209 B2 | 9/2005 | Henderson | |

OTHER PUBLICATIONS

International Search Report dated Nov. 7, 2007 (3 pages).

* cited by examiner

*Primary Examiner*—John C Hong
(74) *Attorney, Agent, or Firm*—Osha • Liang LLP

(57) ABSTRACT

A method for making-up a wedge thread connection comprising a pin member and a box member includes applying a pipe dope to at least one of the pin member and the box member, wherein the pin member and the box member comprise corresponding wedge threads, reducing the viscosity of the pipe dope at least temporarily, and rotating the pin member relative to the box member to make-up the wedge thread connection, wherein the rotation occurs while the viscosity of the pipe dope is at least temporarily reduced. A collar to be used with a tong assembly in making-up a threaded connection between a pin member and a box member includes at least one power unit configured to temporarily reduce the viscosity of pipe dope applied to at least one of the pin member and the box member, and an inner surface having a selected diameter to correspond to an outer diameter of at least one of the pin member and the box member.

16 Claims, 3 Drawing Sheets

DOPE RELIEF METHOD FOR WEDGE THREAD CONNECTIONS

BACKGROUND OF INVENTION

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe, which may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

One type of threaded connection commonly used to form a thread seal in oilfield tubulars is a wedge thread. In FIGS. 1A and 1B, a prior art connection having a wedge thread is shown. "Wedge threads" are characterized by threads, regardless of a particular thread form, that increase in width in opposite directions on a pin member 101 and a box member 102. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIGS. 1A and 1B, on the pin member 101, a pin thread crest 222 is narrow towards the distal end of the pin member 101 while a box thread crest 291 is wide. Moving along an axis 105 (from right to left), the pin thread crest 222 widens while the box thread crest 291 narrows. In FIG. 2, the threads are tapered, meaning that a pin thread 106 increases in diameter from beginning to end while a box thread 107 decreases in diameter in a complimentary manner. Having a thread taper can improve the ability to stab the pin member 101 into the box member 102 and distributes stress in the connection.

Generally, thread seals are difficult to achieve with non-wedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. The above thread forms are examples of thread forms that may be used for embodiments of the invention. Generally, open thread forms such as buttress or stub are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal may be accomplished as a result of the contact pressure caused by interference over at least a portion of the connection between the pin load flank 226 and the box load flank 225 and between the pin stab flank 232 and the box stab flank 231, which occurs when the connection is made-up. Close proximity or interference between the roots 292 and 221 and crests 222 and 291 completes the thread seal when it occurs over at least a portion of where the flank interference occurs. Generally, higher pressure may be contained with increased interference between the roots and crests ("root/crest interference") on the pin member 101 and the box member 102 and by increasing flank interference. The particular connection shown in FIG. 1A also includes a metal-to-metal seal that is accomplished by contact pressure between corresponding seal surfaces 103 and 104, respectively located on the pin member 101 and box member 102.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For tapered wedge threads that are designed to have root/crest clearance, the clearance decreases as the connection is made-up. Regardless of the design of the wedge thread, corresponding flanks come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection, however, this also increases stress on the connection during make-up, which could lead to failure during use.

Before make-up, pipe dope is typically applied to both the pin member and the box member of a threaded connection. Pipe dope provides lubrication to aid the make-up of the connection and prevents galling to allow for the connection to be broken-out at a later time. In oilfield applications, the pipe dope typically contains metallic particles, such as copper, to prevent galling between the threads of the pin member and the box member. The metallic particles also help achieve a thread seal between wedge threads, which make-up on both the load and stab flanks.

Because of the close-fitting manner in which wedge threads make-up, as compared to a shouldered non-wedge thread connection, less pipe dope is required. Typically, the pipe dope is only applied to the pin thread of a wedge thread connection. The application of the pipe dope is also typically achieved with a brush instead of a large swab, as is typical of other non-wedge thread connections. When a wedge thread connection is made-up, excess pipe dope can become trapped between the pin thread and the box thread, which can cause false torque readings (leading to improper make-up) or potentially damage the connection. Many of the problems associated with the pipe dope can be mitigated by applying less pipe dope than non-wedge thread connections and controlling the speed at which the connection is made-up to allow for the pipe dope to squeeze out.

Actually damaging a connection as a result of pipe dope is rare, but is still a concern for operators. One scenario in which damage to the connection can occur is when the pipe dope is too viscous. This can occur in cold weather environments such as North Slope Alaska or the North Sea when the wrong pipe dope is used. For cold environments, pipe dope with lower metal content and reduced kinematic viscosity is supposed to be used. Kinematic viscosity is the ratio of the viscosity of a fluid to its density. Centistoke is a common unit for kinematic viscosity. A centistoke is the viscosity in centipoise divided by the liquid density at the same temperature. If the wrong pipe dope is used and the connection is made-up quickly, as is typical of a power frame used for making-up connections, the pipe dope can become trapped between the pin thread and the box thread, causing a high pressure build-up that expands the box member.

A more common scenario that can occur when making up a wedge thread connection is pipe stand-off. Pipe stand-off refers to the situation in which a connection gives a false torque reading that indicates the connection is fully made-up based on a make-up torque, but is not fully made-up based on the relative position of the pin member and the box member. Often, pipe stand-off is difficult to detect on the rig at the time of make-up, and even a small amount can threaten the integrity of the connection. One cause for pipe stand-off in wedge thread connections is hydraulic lock resulting from inadequate evacuation of pipe dope. The pressure build-up may then bleed off during use, risking accidental back-off of the connection or hydraulic leaks. Pipe stand-off is a particular concern for larger diameter threaded connections, such as those greater than or equal to about 9⅝ inches diameter (24.4 cm). Dope evacuation is more difficult for larger diameter threaded connections because of the longer helical path for the pipe dope.

Furthermore, pipe stand-off may be particularly problematic in strings used at elevated downhole service temperatures (i.e., the temperature a tubular would expected to experience in service). Particularly, in high-temperature service (e.g., temperatures greater than 250° F., a steam-flood string, or a geothermal string), even a small amount of stand-off may be deleterious. For instance, if a made-up wedge connection with even a small amount of stand-off is deployed to a high-temperature well, the dope may flow out of the wedge thread connection and reduce the integrity of the thread seal.

A wide range of pipe dopes are commercially available. Pipe dope is typically a proprietary formulation of lubricant(s) and particulates. In general, higher particulate concentrations result in more viscous pipe dope, which helps to provide a thread seal in wedge thread connections. The base grease is also largely determinative of the final kinematic viscosity of the pipe dope. One company providing pipe dope for threaded connections is JET-LUBE®, Inc. (Houston, Tex., USA). One type of pipe dope provided by JET-LUBE®, Inc. is KOPR-KOTE®, which contains less than 10 percent by weight of copper as the particulate additive. KOPR-KOTE® is provided in an alternative formulation for arctic use, as are several other JET-LUBE® formulations. Higher temperature pipe dopes ("thermal grade") from JET-LUBE® utilize a petroleum oil with a kinematic viscosity of 414 to 506 centistokes at 40 degrees C. The "arctic grade" pipe dopes utilize a calcium base grease with a kinematic viscosity of about 20 to 24 centistokes at 40 degrees C., which is much lower than the thermal grade. Another pipe dope is JET-LUBE® NCS-30, which is specifically marketed for use with wedge thread connections. That pipe dope does not contain metallic particulates. Instead, JET-LUBE® NCS-30 uses a proprietary formulation of chemically inert fibers as the particulate additive. Also, JET-LUBE® NCS-30 uses a calcium base grease similar to the arctic grade compounds to provide reduced kinematic viscosity.

Although many of the problems with making-up a wedge thread are avoided by using a pipe dope with lower kinematic viscosity and/or reduced metal content, a disadvantage to such a pipe dope is reduced sealing ability in the wedge thread. The operating environment in the wellbore is much hotter than the surface, which allows for the pipe dope to flow more easily and not aid in maintaining the thread seal in the wedge thread. In general, the higher the kinematic viscosity of the pipe dope, the better the resulting thread seal in the wedge thread.

In addition to pipe dope selection, mechanical solutions for relieving pressure build-up of wedge thread connections during make-up have been proposed. An example of a mechanical solution is disclosed in U.S. Pat. No. 6,050,610 issued to Enderle and assigned to the assignee of the present invention. The '610 Patent is incorporated herein by reference in its entirety. The '610 Patent discloses a wedge thread connection with a groove in a thread root. The groove provides an escape path for pipe dope during make-up of the wedge thread connection. Similar to the '610 Patent, U.S. Pat. No. 6,905,149 issued to DeLange discloses providing a groove in a thread crest to provide an escape path for pipe dope. However, the groove in the thread crest may prevent a wedge thread so equipped from sealing, as the groove provides a leak path for the pipe dope. Alternatively, in a two-step wedge thread, the thread crest groove may be provided on only one step such that the seal integrity of the connection is not compromised.

The pressure-relief grooves disclosed in the '610 and '149 Patents are limited in depth and width because larger grooves would reduce the strength of the threaded connection. Because of the limited size, pressure-relief grooves and other mechanical solutions to pressure build-up of wedge thread connections during make-up may fail to prevent connection damage and pipe stand-off for problematic connections, such as larger diameter wedge thread connections.

SUMMARY OF INVENTION

In one aspect, the present invention relates to a method for making-up a wedge thread connection including a pin member and a box member. Preferably, the method includes applying a pipe dope to at least one of the pin member and the box member, wherein the pin member and the box member comprise corresponding wedge threads.

The method includes reducing the viscosity of the pipe dope at least temporarily and rotating the pin member relative to the box member to make-up the wedge thread connection, wherein the rotation occurs while the viscosity of the pipe dope is at least temporarily reduced.

In another aspect, the present invention relates to a method to make-up a wedge thread connection including a pin member and a box member. The method preferably includes applying a pipe dope to at least one of the pin member and the box member, wherein the pin member and the box member comprise corresponding wedge threads. Furthermore, the method includes temporarily reducing the viscosity of the pipe dope and making-up the wedge thread connection while the viscosity of the pipe dope is temporarily reduced.

In another aspect, the present invention relates to a collar to be used with a tong assembly in making-up a threaded connection between a pin member and a box member. Preferably, the collar includes at least one power unit configured to temporarily reduce the viscosity of pipe dope applied to at least one of the pin member and the box member. Furthermore, the collar includes an inner surface having a selected diameter to correspond to an outer diameter of at least one of the pin member and the box member.

Other aspects and advantages of the invention will be apparent from the following description and the appended claims.

DETAILED DESCRIPTION

Figure 1A:
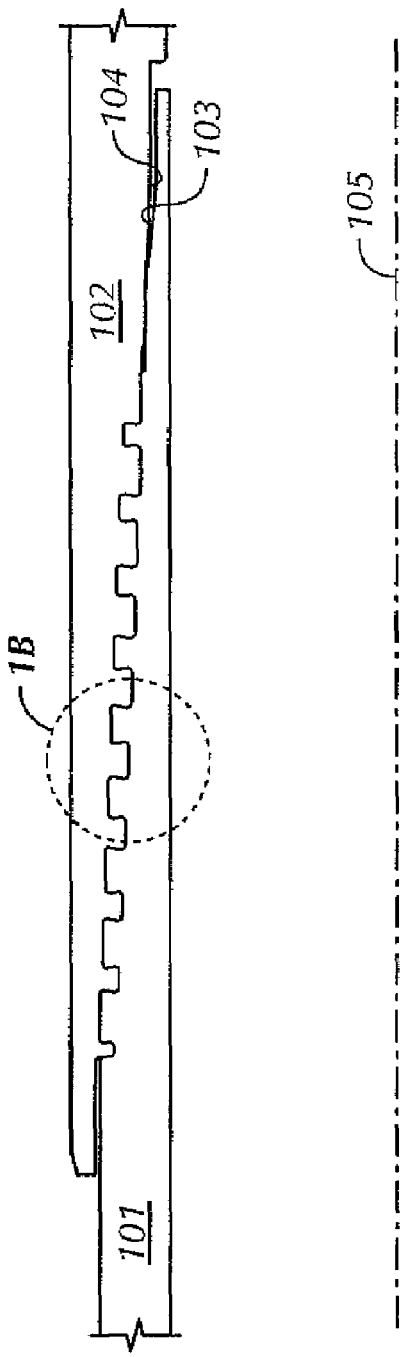
FIGS. 1A and 1B show a prior art wedge thread connection.
Figure 1B:
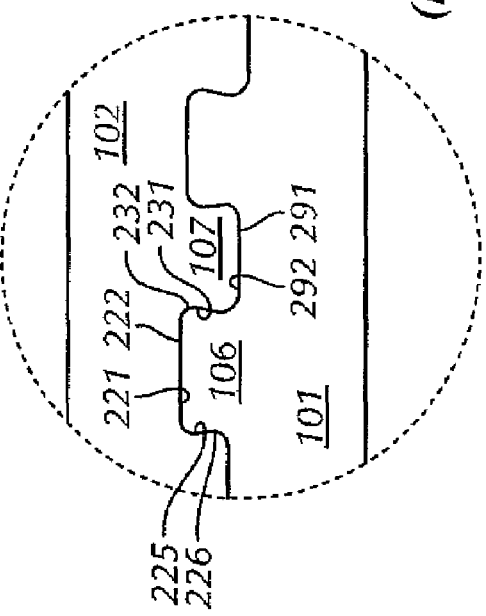

The present invention relates to a method for making-up a wedge thread connection. More specifically, the present invention relates to methods for minimizing pressure build-up in a wedge thread connection resulting from pipe dope being unable to escape during make-up.

The manner in which a wedge thread connection is made-up can have a significant effect on whether pipe stand-off occurs. For example, a high relative angular velocity of the pin member and the box member during the make-up can worsen the pressure build-up because the pipe dope is unable to flow around the helix of the wedge threads fast enough to escape. Because of this concern, field service procedures for making-up wedge thread connections may include maximum rotational speeds during make-up. For example, smaller diameter wedge thread connections may be limited to 25 revolutions per minute and larger diameter wedge thread connections (such as 9⅝ inch diameter connections) may be limited to 15 revolutions per minute. The difference in recommended rotational speeds is a result of the higher tangential velocity of the larger diameter connections.

Minimizing the amount of pipe dope spread on the wedge threads prior to make-up reduces the amount of pipe dope that can become trapped and cause pressure build-up. Typically, pipe dope is spread with a brush on only one of the members of a wedge thread connection. However, precise control of the volume and distribution of the pipe dope can be difficult to achieve in practice on a drilling rig.

As discussed above, lower viscosity pipe dope is less susceptible to pressure build-up because of the improved flow characteristics. However, this advantage is counter-balanced with the disadvantage of reduced lubrication and sealing capability during use, particularly when the use is in a higher temperature environment. It would be advantageous to have a low viscosity during make-up and a high viscosity during use.

Two techniques that can be used to temporarily reduce the viscosity of pipe dope are vibration and heat. In accordance with an embodiment of the present invention, a wedge thread connection is heated before or during make-up and/or vibrated during make-up to reduce the viscosity of the pipe dope at least temporarily to allow for excess pipe dope to be squeezed out of the wedge thread connection during make-up. The heating of the wedge thread connection may be done shortly prior to make-up as long as the wedge thread connection remains at or above a selected temperature during make-up. The selected temperature will vary depending on the properties of the pipe dope applied to the wedge thread connection. Alternatively, the pipe dope may be heated before it is applied to the wedge thread connection. Those having ordinary skill in the art will appreciate that the viscosity of the pipe dope may not return to exactly the original viscosity of the pipe dope after the viscosity is reduced by heating and/or vibrating during make-up.

Pipe dope is typically a colloidal fluid, having small particles such as graphite or copper dispersed therein. Vibrating the wedge thread connection during make-up can reduce the apparent viscosity of the pipe dope by aiding the movement of the small particles in the pipe dope. The optimum frequency of the vibration will vary according to the properties of the pipe dope applied to the wedge thread connection.

Figure 2:
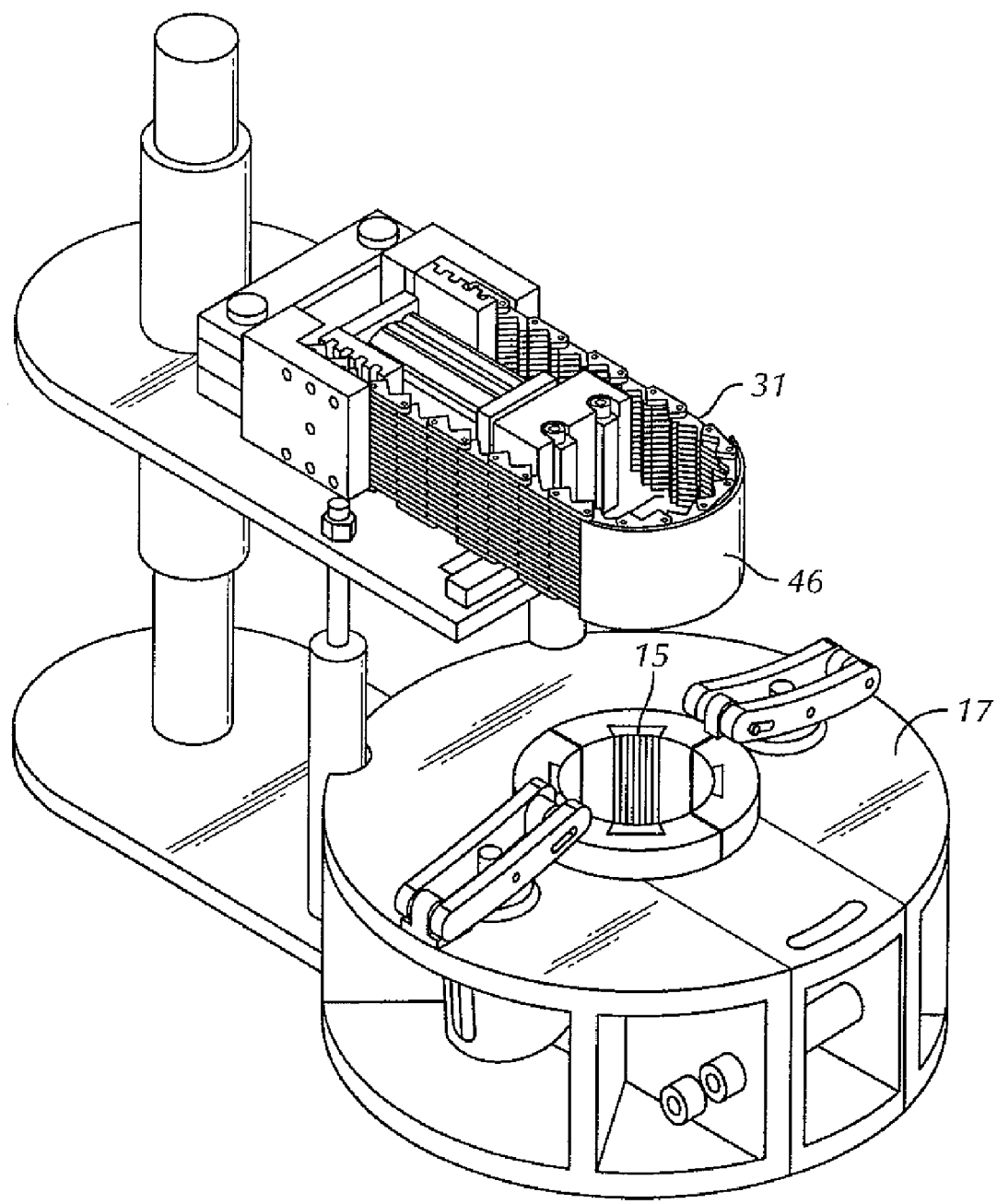
FIG. 2 shows a set of power tongs for use with a method in accordance with an embodiment of the present invention.

Methods in accordance with embodiments of the present invention are not limited to particular methods for heating or vibrating a wedge thread connection except as otherwise explicitly claimed. FIG. 2 shows a set of make-up tongs that may be used with a make-up collar shown in FIG. 3 in accordance with an embodiment of the present invention. Wedge thread connections are often made-up using power tongs, such as those shown in FIG. 2. A typical set of power tongs includes a stationary "back-up tong" 17 and a rotatable "power tong" 46. One member is held in place by the back-up tong 17 while the power tong 46 grips the other member and rotates to make-up the wedge thread connection. Gripping is achieved using gripping members 15 and 31 disposed within the back-up tong 17 and power tong 46 respectively. To avoid damaging the threaded portions of the wedge thread connection, the gripping members 15 and 31 are typically located to be below and above the threaded portions during make-up.

In accordance with an embodiment of the present invention, a make-up collar 401 may be placed around the threaded portion of a wedge thread connection during the make-up operation. In this particular embodiment, the make-up collar 401 is a split ring with a hinge 405, which allows for the make-up collar 401 to be opened and closed around the threaded portion of the wedge thread connection. The inner surface 412 may contact the outer diameter of the box member in order to transmit heat or vibration to the wedge thread connection. The make-up collar 401 may further include power units 411 and 410 to generate heat or vibration. After placing the make-up collar 401 around the threaded portion of the wedge thread connection, the power units 411 and 410 may be turned on in order to heat or vibrate the wedge thread connection to temporarily reduce the viscosity of the pipe dope during make-up. Those having ordinary skill in the art will appreciate that many methods are available for heating or vibrating the wedge thread connection. As such, the present invention is not limited to any particular heat or vibration source. For example, the heat may be generated through induction. In one embodiment, vibration may be generated using an eccentric motor rotating at a selected rate to determine the frequency of the vibration.

Further, the location at which heat and/or vibration are applied to the wedge thread connection may vary. In one embodiment, a heat or vibration source may be integrated into the power tongs being used to make-up the wedge thread connection. The ability of the metal pin member and box member to transmit heat and vibration may allow for the heat or vibration source to be in locations other than directly over the threaded portion of the wedge thread connection.

The temperature to which the wedge thread connection is heated may be selected to be about or greater than the downhole service temperature in which the wedge thread connection will be used. By selecting a temperature according to the downhole service temperature, the wedge thread connection will be made-up with the pipe dope at or less than the viscosity of the pipe dope downhole. This prevents the bleed-off of any built up pressure in the wedge thread connection because any flow of the pipe dope will have occurred during make-up when the viscosity was temporarily reduced.

Embodiments of the present invention may provide one or more of the following advantages. Heating and/or vibrating the wedge thread connection during make-up temporarily reduces the viscosity of the pipe dope. The reduced viscosity of the pipe dope allows for improved flow characteristics that allow excess pipe dope to be evacuated, thereby reducing the risk of pressure build-up during the make-up of the wedge thread connection. As a result, the risk of pipe stand-off may be significantly reduced, even for larger diameter wedge thread connections.

An advantage of a make-up method versus mechanical solutions, such as crest or root grooves, is that embodiments of the present invention do not require additional features to be machined into the wedge thread connection. Additional features in the wedge thread connection further increase the manufacturing complexity inherent in a wedge thread connection. As a result, the additional features further increase manufacturing cost. By changing the method in which the wedge thread connection is made-up, the need for mechanical solutions to pipe dope evacuation can be eliminated or reduced in order to save manufacturing costs. Further, mechanical solutions in the prior art may fail to provide a sufficient flow path for excess pipe dope to flow, particularly for larger diameter wedge thread connections. Increasing the depth and/or width of the root or crest grooves may also reduce the strength of the wedge thread connection. Make-up methods in accordance with embodiments of the present invention do not affect the mechanical integrity of the wedge thread connection.

Figure 3:
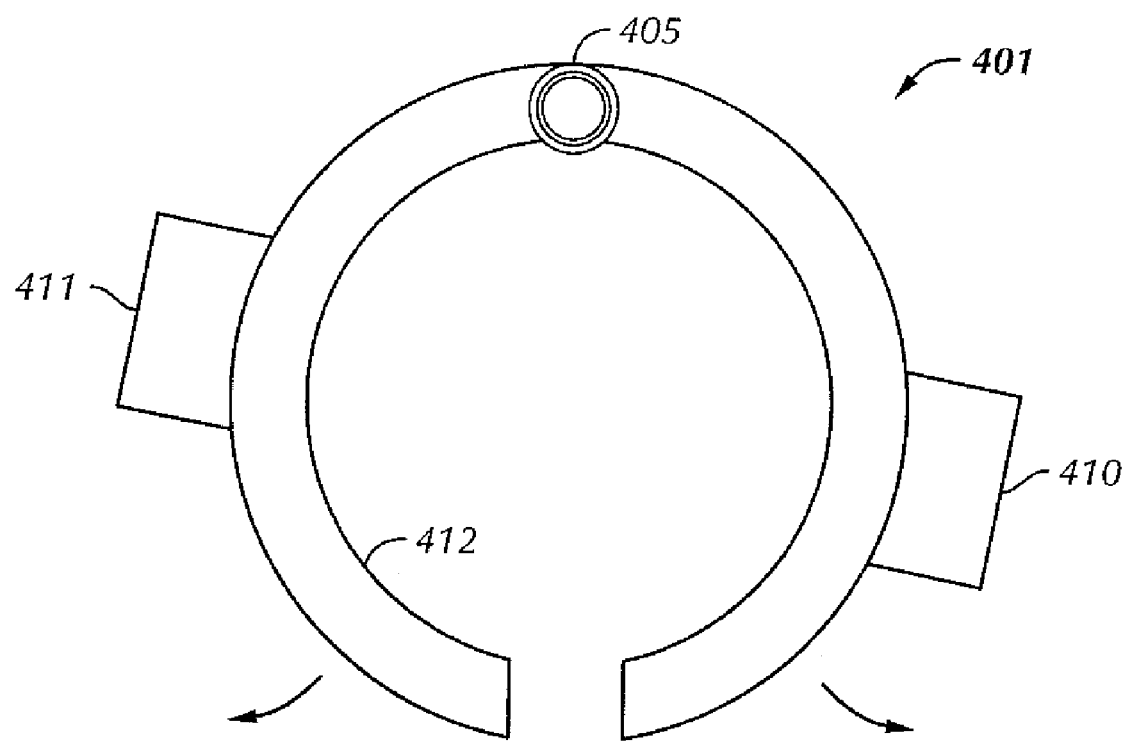
FIG. 3 shows a make-up collar in accordance with an embodiment of the present invention.

An advantage to using a make-up collar 401, such as the embodiment shown in FIG. 3, is that the make-up collar 401 can provide reinforcement to the outer diameter of the box member during make-up. Large diameter pipe with thin walls have a tendency to become eccentric after manufacture and during make-up. If sized to firmly fit around the outer diameter of a box member, a make-up collar 401 help to reduce eccentricity of the wedge thread connection by forcing the box member and pin member into round.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to make-up a wedge thread connection, the method comprising:
   applying a pipe dope to at least one of a pin member and a box member;
   reducing the viscosity of the pipe dope at least temporarily;
   rotating the pin member relative to the box member to make-up the wedge thread connection; and
   wherein the rotation occurs while the viscosity of the pipe dope is at least temporarily reduced.

2. The method of claim 1, wherein the temporarily reduced viscosity of the pipe dope is achieved by heating the wedge thread connection to a selected temperature.

3. The method of claim 2, wherein the selected temperature is at least a downhole service temperature for the wedge thread connection.

4. The method of claim 1, wherein the temporarily reduced viscosity of the pipe dope is achieved by heating the pipe dope to a selected temperature.

5. The method of claim 1, wherein the temporarily reduced viscosity of the pipe dope is achieved by vibrating the wedge thread connection.

6. The method of claim 1, further comprising:
   attaching a make-up collar around at least one of the pin member and the box member, wherein the make-up collar comprises at least one of a heat source and a vibration source.

7. The method of claim 6, wherein the make-up collar comprises a hinged portion.

8. The method of claim 6, wherein the make-up collar comprises an inner surface having a selected diameter to correspond to an outer diameter of the box member.

9. A method to make-up a wedge thread connection comprising a pin member and a box member, the method comprising:
   applying a pipe dope to at least one of the pin member and the box member, wherein the pin member and the box member comprise corresponding wedge threads;
   temporarily reducing the viscosity of the pipe dope; and
   making-up the wedge thread connection while the viscosity of the pipe dope is temporarily reduced.

10. The method of claim 9, wherein the temporarily reduced viscosity of the pipe dope is achieved by heating the wedge thread connection to a selected temperature.

11. The method of claim 10, wherein the selected temperature is at least a downhole service temperature for the wedge thread connection.

12. The method of claim 9, wherein the temporarily reduced viscosity of the pipe dope is achieved by pre-heating the pipe dope to a selected temperature.

13. The method of claim 12, wherein the selected temperature is at least a downhole service temperature for the wedge thread connection.

14. The method of claim 9, wherein the temporarily reduced viscosity of the pipe dope is achieved by vibrating the wedge thread connection.

15. The method of claim 9, wherein the making-up of the wedge thread connection comprises rotating the pin member relative to the box member.

16. The method of claim 9, wherein the making-up of the wedge thread connection comprises rotating the box member relative to the pin member.

* * * * *